(12) United States Patent
Tomatis et al.

(10) Patent No.: US 8,275,022 B2
(45) Date of Patent: Sep. 25, 2012

(54) CDMA RECEIVERS AND CDMA COMMUNICATIONS SYSTEMS

(75) Inventors: Fabrizio Tomatis, Vallauris (FR); Pierre Demaj, Nice (FR)

(73) Assignee: ST-Ericsson SA, Geneva (CH)

( * ) Notice: Subject to any disclaimer, the term of this patent is extended or adjusted under 35 U.S.C. 154(b) by 440 days.

(21) Appl. No.: 12/530,181

(22) PCT Filed: Mar. 5, 2008

(86) PCT No.: PCT/IB2008/050795
§ 371 (c)(1),
(2), (4) Date: Jan. 8, 2010

(87) PCT Pub. No.: WO2008/107848
PCT Pub. Date: Sep. 12, 2008

(65) Prior Publication Data
US 2010/0135361 A1    Jun. 3, 2010

(30) Foreign Application Priority Data
Mar. 6, 2007 (EP) ..................... 07103581

(51) Int. Cl.
*H04B 1/00* (2006.01)
(52) U.S. Cl. ........................ 375/147; 375/144
(58) Field of Classification Search .................. 375/144, 375/147–148, 316, 346–347, 349; 455/132, 455/137; 370/320, 335, 342
See application file for complete search history.

(56) References Cited

U.S. PATENT DOCUMENTS

| | | | | |
|---|---|---|---|---|
| 5,926,503 A | * | 7/1999 | Kelton et al. | 375/148 |
| 6,680,967 B1 | * | 1/2004 | Westman | 375/148 |
| 6,813,309 B1 | * | 11/2004 | Ogino | 375/148 |
| 7,340,017 B1 | * | 3/2008 | Banerjee | 375/348 |
| 8,041,325 B2 | * | 10/2011 | Jonsson et al. | 455/296 |
| 2003/0026233 A1 | | 2/2003 | Ohsuge | |
| 2004/0156423 A1 | | 8/2004 | Li et al. | |
| 2008/0252512 A1 | | 10/2008 | Demaj | |

FOREIGN PATENT DOCUMENTS
WO    2006/053475    5/2006

OTHER PUBLICATIONS

PCT International Search Report With Written Opinion of the International Searching Authority PCT/IB2008/050795, mailing date, Jul. 17, 2008, pp. 10.

* cited by examiner

*Primary Examiner* — Khanh C Tran
(74) *Attorney, Agent, or Firm* — William J. Kubida; Hogan Lovells US LLP

(57) ABSTRACT

A CDMA communications system includes a primary station and at least one secondary station. The secondary station includes a receiver for receiving CDMA signals transmitted on the downlink. The receiver includes a plurality of Rake finger receivers having inputs for receiving signals and outputs coupled to a combining stage for combining their output signals constructively, a finger assignment stage for assigning the finger receivers to respective received signals, a processing stage for estimating the speed of the CDMA receiver from the signals received and for varying the time required to make a finger replacement decision in response to the estimated speed so that the time required decreases as the speed of the receiver increases and vice versa.

20 Claims, 5 Drawing Sheets

CDMA RECEIVERS AND CDMA COMMUNICATIONS SYSTEMS

CROSS-REFERENCE TO RELATED APPLICATIONS

The present application is a national filing in the U.S. Patent & Trademark Office of PCT/IB2008/050795 filed Mar. 5, 2008, and claims priority of EP Application No. 07103581.0 filed Mar. 6, 2007, both of which applications are incorporated herein in their entireties by this reference.

TECHNICAL FIELD

The present invention relates to improvements in or relating to CDMA (Code Division Multiple Access) receivers, a method of operating such receivers, and particularly but not exclusively to a hysteresis algorithm for finger replacement. The present invention also relates to improvements in or relating to CDMA communications systems and to a method of operating such systems

BACKGROUND ART

In mobile communications, when a signal is transmitted by an antenna it is subject to the effects of multipath and, as viewed from the receiver, the transmission comprises a plurality of radio waves simultaneously propagated to the same receiver. Multipath, i.e., interference occurring between the plurality of radio waves, will cause the radio waves to have different propagation delay times to the receiver. This is because of varying propagation path lengths of the radio waves. In DS-CDMA (Direction Sequence-Code Division Multiple Access) communication, information data is spread with spreading codes at a higher rate with a shorter period than the propagation time. For this reason, radio waves with different propagation delay times can be separated and extracted.

Movements of a mobile station change the positional relationship between the mobile station and a base station, and hence the delay profile, which is signal distribution with respect to delay time, also changes over time. Signals propagating along paths other than paths in which a base station is directly viewed from a mobile station are varied in accordance with the Rayleigh distribution.

In DS-CDMA communication, a plurality of path signals separated in terms of time with different propagation delay times and changing in accordance with the Rayleigh distributions are in-phase combined (rake combined) to obtain a diversity effect, thereby improving reception characteristics. However the relative positional change of a mobile station with respect to a base station causes variations in delay profile as well as variations in delay time of paths to be rake combined. Therefore, in a mobile communication environment, a receiver requires a multipath search, tracking function for following variations in delay profile to allow instantaneous rake combination of the plurality of paths that can provide maximum signal power.

In a conventional method of allocating multipath to fingers, a delay profile for propagation paths is first measured with a matched filter or sliding correlator. Upper correlation peaks are detected from the measured delay profile, the number of the detected correlation peaks being equal to the number of fingers possessed by a Rake receiver. A detected path timing is allocated as despread timing for each finger. A problem can occur in the case of a receiver having N fingers, where N is an integer, is that the delay profile has a Nth correlation peak and a (N+1)th correlation peak with substantially equal powers, the Nth and (N+1)th path timings frequently interchanging depending on variations in propagation path. This causes frequent switching of allocated path timing (despread timing) in one of the fingers, resulting in significantly deteriorated reception characteristics.

US 2003/0026233 A1 discloses a method of, and CDMA receiver for, providing hysteresis in detection of path timing by multiplying the delay profile by a weighting coefficient. The CDMA receiver includes calculating means, operational means and search means. The calculating means calculates a state weighting coefficient based on the present path allocation to a plurality of finger receivers. The operational means performs a predetermined operation between the calculated state weighting coefficient and a delay profile. The search means searches for paths based on the weighted delay profile. In implementing the method disclosed, state weighting, calculated on the basis of the present state of allocation to rake fingers, is performed for a measured delay profile in a multipath search unit of a Rake receiver, which provides hysteresis for path switching level of fingers to make it possible to prevent frequent switching of paths which leads to deteriorated characteristics. More particularly path switching will only take place if the correlation power of a new candidate path exceeds an existing path by a factor $\alpha$, where typically a is equal to approximately 1.5. In this way it is possible to provide hysteresis for replacement of paths and to prevent frequent replacement of paths. The cited method can also protect path timing for finger receivers even when a path is temporarily lost due to shadowing or the like, resulting in improved reception characteristics.

US 2004/0156423 A1 discloses a method of channel gain estimation in a Rake receiver using complex weight generation (CWG) algorithms. This citation is concerned with correcting a frequency offset between a base station (BS) and wireless transmit/receive units (WTRU), which frequency offset translates into a phase shift over time and must be estimated and corrected in the WTRU or else a significant loss in performance will occur. In the case of the WTRU being carried in a vehicle the speed of the vehicle will introduce time and frequency shift which could cause severe performance degradation within the Rake receiver. However, it is possible to estimate the phase shift and compensate for it in the CWG process since the phase shift is due to a constant frequency offset.

In 3GPP (Third Generation Partnership Project) standard specification there is no method proposed to define finger assignment algorithm. The number of fingers to be assigned is in general limited (for size and power consumption reasons). When a path is disappearing because its power falls below a specified value, the associated finger is removed so as to be available to another stronger path. However in the opposite situation when a powerful path appears and all the fingers having been assigned already, finger replacement makes sense and can be critical. Although hysteresis is desirable to avoid frequent switching of paths, it can be problematic in slowing down a finger replacement process.

SUMMARY OF THE INVENTION

An object of the present invention is to be able to minimise delay in effecting finger replacement in a Rake receiver.

According to a first aspect of the present invention there is provided a method of operating a Code Division Multiple Access, hereinafter referred to as CDMA, receiver comprising a plurality of finger receivers having inputs for receiving signals and outputs coupled to means for combining their output signals constructively and means for assigning the finger receivers to respective received signals, the method comprising estimating the speed of the CDMA receiver from the signals received and varying the time required to make a finger replacement decision in response to the estimated speed so that the time required decreases as the speed of the receiver increases and vice versa.

According to a second aspect of the present invention there is provided a CDMA receiver comprising a plurality of finger receivers having inputs for receiving signals and outputs coupled to means for combining their output signals constructively and means for assigning the finger receivers to respective received signals, characterised in that the receiver further comprises means for estimating the speed of the CDMA receiver from the signals received and means responsive to an estimation of the speed of the receiver for varying the time required to make a finger replacement decision in response to the estimated speed so that the time required decreases as the speed of the receiver increases and vice versa.

According to a third aspect of the present invention there is provided a CDMA communications system comprising a primary station and at least one secondary station, the secondary station including a transmitter and a receiver, the receiver comprising a plurality of finger receivers having inputs for receiving signals and outputs coupled to means for combining their output signals constructively and means for assigning the finger receivers to respective received signals, characterised in that the receiver further comprises means for estimating the speed of the receiver from the signals received and means responsive to an estimation of the speed of the receiver for varying the time required to make a finger replacement decision in response to the estimated speed so that the time required decreases as the speed of the receiver increases and vice versa.

According to a fourth aspect of the present invention there is provided a method of operating a CDMA communications system comprising a primary station and at least one secondary station, the primary station comprising a transmitter for transmitting CDMA signals on a downlink, and the at least one secondary station including a receiver for receiving CDMA signals transmitted on the downlink, the receiver comprising a plurality of finger receivers having inputs for receiving signals and outputs coupled to means for combining their output signals constructively and means for assigning the finger receivers to respective received signals, the method comprising receiving signals on the downlink, estimating the speed of the CDMA receiver from the signals received and varying the time required to make a finger replacement decision in response to the estimated speed so that the time required decreases as the speed of the receiver increases and vice versa.

The present invention is based on recognition of the fact that hysteresis values and power measurement interval can be dynamically selected having regard to speed. For a fixed measurement interval, by making the hysteresis threshold a function of speed, the probability of missing a finger replacement decreases as the receiver speed increases.

BRIEF DESCRIPTION OF DRAWINGS

The present invention will now be described, by way of example, with reference to the accompanying drawings, wherein.

In the drawings the same reference numerals have been used to indicate corresponding features.

DETAILED DESCRIPTION OF PREFERRED EMBODIMENTS

Figure 1:
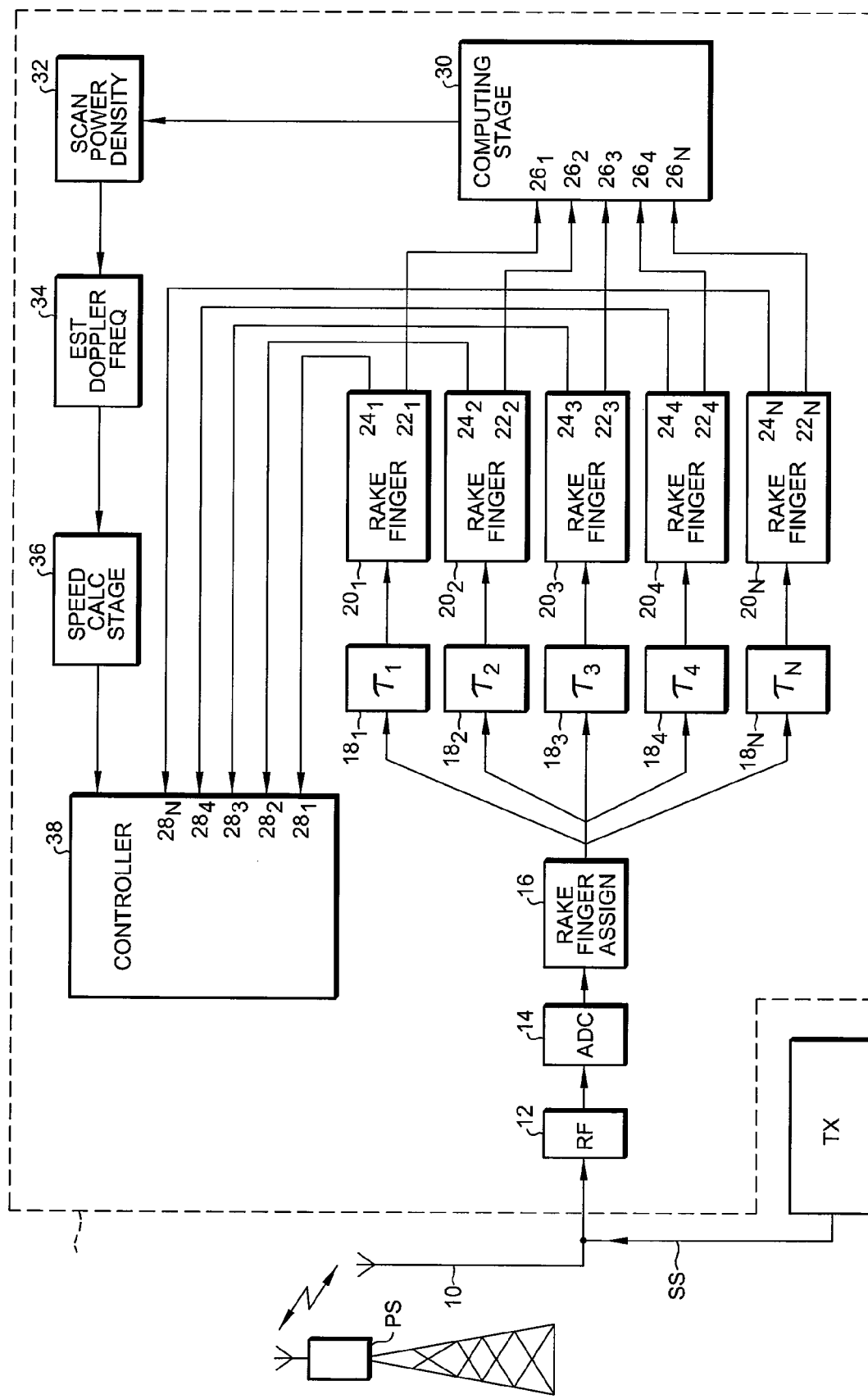
FIG. 1 is a block schematic diagram of a DS-CDMA communication system.

The communication system illustrated in FIG. 1 is able to operate in accordance with any suitable DS-CDMA standard, such as 3 G or UMTS (Universal Mobile Telecommunications System), in which stations use the same frequency band for communication and are identified by the use of distinguishing spreading codes. The UMTS standard has provision for common downlink physical channels P-CPICH (Primary Common Pilot Channel) and S-CPICH (Secondary Common Pilot Channel). Both CPICHs are fixed rate (30 kbits/s) downlink physical channels that carry a pre-defined bit sequence, also denoted as pilot symbols. As a result, a phase discrimination method using CPICH can be used for estimating the frequency offset $f_o$ between the carrier frequency and the local oscillator frequency used to mix the carrier frequency down to baseband.

PCT Application IB 2006/053475 discloses a method of determining the frequency offset $f_o$ based on estimating the phase variation between consecutive pilot symbols. The frequency offset is obtained as the expectation of the following ratio:

$$f_o = E\left(\frac{\Delta\varphi}{\Delta T}\right)$$

where:
$\Delta\phi$ stands for the phase variation between two consecutive pilot symbols,
$\Delta T$ is the inverse of the symbol rate,
E ( . . . ) denotes the expectation of the average function.

Due to radio receiver displacements, the frequency of the received radio signal is offset. This is known as the Doppler effect. As a consequence, for example, a high percentage of the baseband signal power in a power density spectrum lies in a frequency sub-range $[-f_d, f_d]$, where $f_d$ is the Doppler maximum frequency. The sub-range $[-f_d, f_d]$ is known as the Doppler bandwidth. Determining the Doppler frequency $f_D$ is useful method of estimating the radio receiver speed using for example an equation:

$$f_D = \frac{v}{c} \cdot f_c$$

where $v$ is the wireless receiver speed,
c is the speed of light, and
$f_c$ is the channel carrier frequency.

Referring now to FIG. 1, the communication system comprises at least one primary station PS, which may be fixedly sited, and a plurality of secondary stations SS, one of which is shown in the drawing. The primary station PS may be embodied as a fixed network of geographically separated nodes coupled to a system controller (not shown). At least some of the secondary stations SS are mobile and are able to roam geographically within the radio coverage area of the system whilst communicating with the primary stations forming the fixed network and other active secondary stations registered with the network.

The or each secondary station SS comprises a receiving section Rx and a transmitting section Tx both of which are connected to a common antenna 10 for the reception and transmission of DS-CDMA signals. The DS-CDMA signals may be scrambled to provide extra security. The receiving section Rx has a Rake receiver architecture comprising a plurality of Rake fingers $20_1$ to $20_N$, each comprising a sub-receiver. An RF stage 12 including an automatic gain control (AGC) stage is coupled to the antenna 10. An output of the RF stage 12 is coupled to an analog-to-digital (ADC) stage 14 in which the received signals are digitised. A Rake finger assignment stage 16 has an input coupled to an output of the ADC stage 14 and an output coupled respectively to a delay element $18_1$ to $18_N$ in the input path to each of the Rake fingers. The delay elements $18_1$ to $18_N$ apply respective time delays $\tau_1$ to $\tau_N$.

In the interests of brevity as the recovery of the data symbols is normal and does not form a part of the present invention, it will not be described in detail. However for the sake of completeness the sub-receiver in each of the Rake fingers has a data output (not shown) coupled respectively to a signal combining stage (not shown). The signal combining stage constructively combines the data outputs from the respective Rake fingers to form data symbols.

Each of the Rake fingers $20_1$ to $20_N$ has first and second outputs $22_1$ to $22_N$ and $24_1$ to $24_N$, respectively. Each of the first outputs $22_1$ to $22_N$ provides a respective estimated pilot signal CPICH and each of the second outputs $24_1$ to $24_N$ respectively provide a RSCP (Received Signal Code Power) signal. The first outputs $22_1$ to $22_N$ are coupled to respective inputs $26_1$ to $26_N$ of a computing stage 30 for calculating a power density spectrum from the averaged and down sampled estimated pilot signals CPICHs. A stage 32 coupled to an output of the computing stage 30 scans the power density spectrum and supplies an output to a stage 34. The stage 34 estimates the Doppler frequency $f_D$ and supplies the result to a speed calculating stage 36. A controller 38 having inputs $28_1$ to $28_N$ for the respective RSCP signals and the calculated speed, determines the fingers to be assigned by the Rake finger assignment stage 16.

Figure 2:
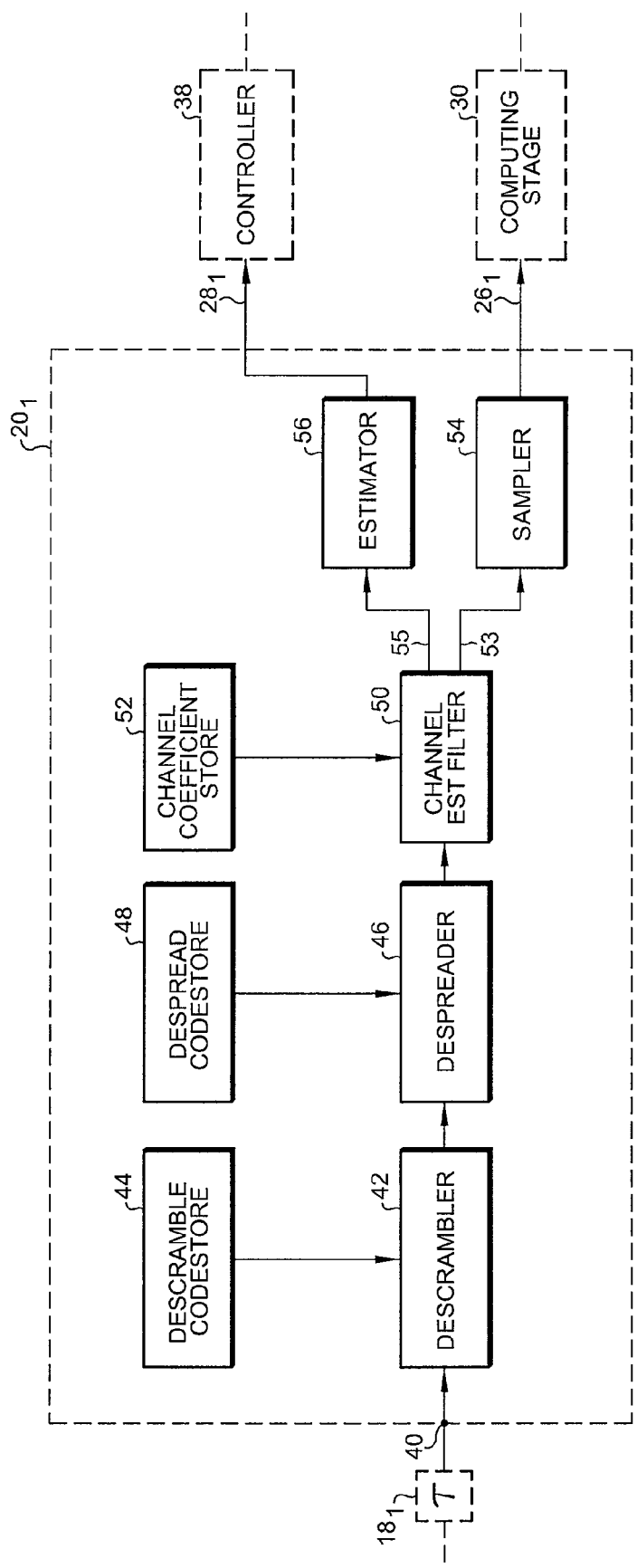
FIG. 2 is a block schematic diagram of a Rake finger.

FIG. 2 illustrates an embodiment of a Rake finger $20_1$. An input terminal 40 connects the delay element $18_1$ to a descrambler 42. A descramble code store 44 provides a descramble code to the descrambler 42 in order to recover the DS-CDMA signals. The recovered DS-CDMA signals are supplied to a despreader 46. A despread code store 48 is coupled to the despreader 46 and assuming that the despread code matches the spreading code applied at the primary station PS to the signals transmitted on a downlink to the secondary station SS the data signals will be recovered. The recovered data signals are applied to a channel estimation filter 50. A channel coefficient store 52 applies weighting coefficients to the channel estimation filter 50. A first output 53 of the channel estimation filter 50 is coupled to an averaging and down sampling device 54. An output of the averaging and down sampling device 54 is coupled to the input $26_1$ of the computing stage 30. A second output 55 of the channel estimation filter 50 is coupled to a RSCP (Received Signal Code Power) estimator 56 which has an output coupled to the input $28_1$ of the controller 38.

The finger assignment stage 16 operates in accordance with an algorithm for optimising the finger selection taking into account the speed of the secondary station. In general the finger assignment is used for managing the multipath contributions as well as the soft handover combining. Finger assignment operation is responsible for activating and deactivating the fingers in a Rake receiver. Depending on the algorithm used for the finger assignment, the performance of the receiver measured in terms of BLER (BLock Error Rate) will be affected. An optimum finger assignment algorithm would then reduce the BLER taking advantage of the best multi-paths coming from the best cells at a certain time T.

In particular, the number of fingers to be assigned is in general limited (for size and consumption reasons). However when a powerful path appears in the multipath signal and all the fingers have already been assigned, replacing a path already assigned a finger with the more powerful makes sense and can be critical.

The critical points in the currently known methods of finger replacement are:
1. Hysteresis threshold on path power for finger replacement decision (Hysteresis interval HYST_WIN), and
2. Path power measurement interval MEAS_WIN.

These two critical points will now be analysed in greater detail.

With respect to the first point, as the receiver will be operating in a fading environment, the power in each measured path will vary in time as a function of the fading profile. As there is a limited time for measurement, namely MEAS_WIN, during which different power measurements are averaged in time it reasonable to assume a Gaussian distribution of the final measurement (once every MEAS_WIN). The hysteresis interval HYST_WIN for taking the finger replacement decision is computed starting from the variance of estimation of this Gaussian distribution. If MEAS_WIN is considered to be constant, the variance of the power estimation is function of speed only.

With respect to the second point, the power measurement interval MEAS_WIN determines the reaction time of the finger assignment decision. The algorithm should react fast to environment changes. This requirement is visible in the 3GPP requirement specification (25.101) birth-death test case. Consequently, there is a real gain in reducing MEAS_WIN, each time it is possible.

HYST_WIN definition: assuming that the measures are independent, a Gaussian distribution is considered for the average measure. From this hypothesis and assuming that the average path magnitude value in dBs is called PathMagAvg, the interval, which includes statistically the 90% of measurements, is $$\text{HYST\_WIN}=[\text{PathMagAvg}-1.64\,\text{Variance}, \text{PathMagAvg}+1.64\,\text{Variance}]$$

Classical algorithm would use the worst-case variance of the power estimation for choosing the HYST_WIN (bigger threshold) and MEAS_WIN (longest integration length) to cover all the possible cases. This conservative approach leads to miss some replacements, especially at high speeds.

The method in accordance with the present invention aims to achieve a performance improvement of the algorithm by using the speed estimation to adapt automatically the HIST_WIN as well as the MEAS_WIN. Thus for a fixed measurement interval, by making the hysteresis a function of speed, the probability of missing a finger replacement decreases as the receiver speed increases. Two algorithms are possible for finger replacement:
(1) Make the MEAS_WIN constant and adjust HYST_WIN as a function of speed.
(2) Make HYST_WIN constant and adjust MEAS_WIN as a function of speed.

Figure 3:
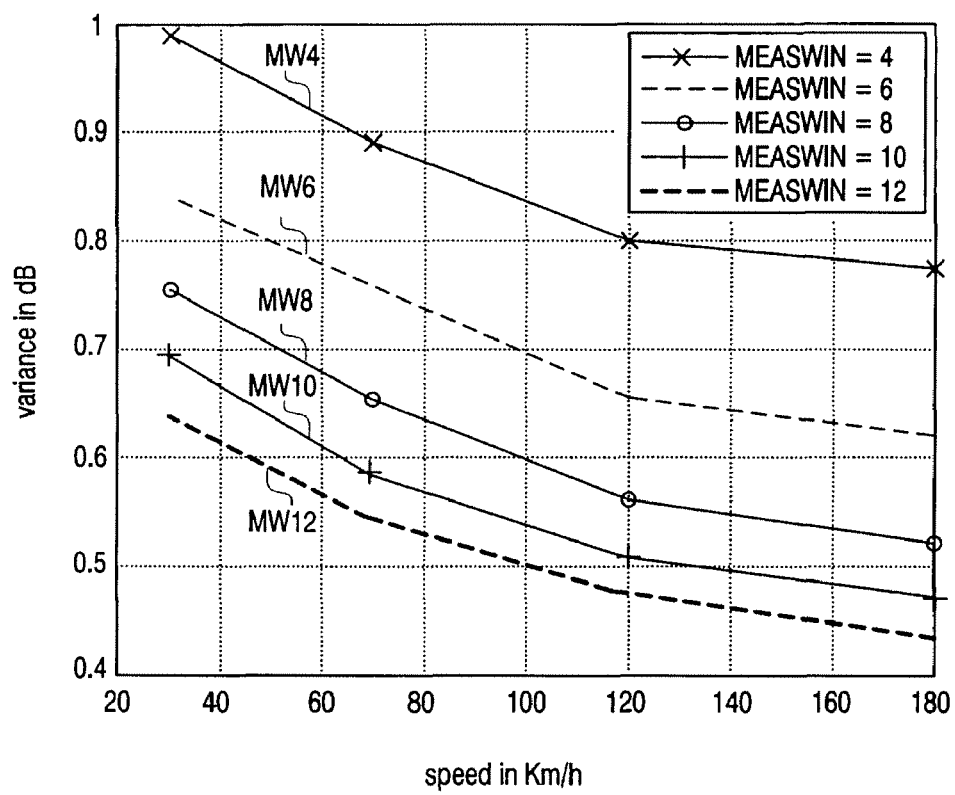
FIG. 3 shows a series of curves illustrating the variance on measurements in dBs, as a function of speed in Km/h, for different MEAS_WIN.

In order to illustrate the two algorithms reference is made to FIG. 3 which illustrates the variance on measurements in dBs, as a function of speed in Km/h, for different MEAS_WINs. For convenience of identification the respective curves will be referenced MW4 to MW12 where MW4 refers to a measurement window MEAS_WIN=4, MW6 to MEAS_WIN=6 and so on.

Applying algorithm (1), MEAS_WIN is fixed by assuming that MEAS_WIN=10, then the HYST_WIN can be adjusted, as a function of estimated speed, according to the curve MW10 as to be equal to f(Variance). Algorithm (1) can be summarised by saying that for a fixed measurement period the hysteresis is lower at a high speed and higher at a low speed which means a finger replacement decision can be made quicker at a higher speed than at a lower speed.

Applying algorithm (2), HYST_WIN is fixed, that is HYST_WIN=f(Variance), at say a Variance of 0.6. Then MEAS_WIN is adjusted as a function of the speed estimation according to the curves MW 6 to MW12, MW4 is not relevant to this example as its minimum value is too high. Considering the speed to be equal to 40 Km/h, MEAS_WIN will be 12, that is the curve MW12 has a Variance of approximately 0.6 at 40 Km/h, at 60 Km/h MEAS_WIN will be 10 (curve MW10), at 100 Km/h MEAS_WIN will be 8 (curve MW8) and at 180 Km/h MEAS_WIN will be 6 (curve MW6). The algorithm (2) can be summarised by saying that for a fixed Variance, the measurement window decreases with increasing speed so that a finger replacement decision can be made quicker at a higher speed and vice versa.

Since the curves MW4 to MW12 have a relatively flat slope of the variance as a function of speed, the quality of speed estimation need not be too precise. This means that the means for estimating the speed of the receiver is not a critical part in terms of complexity and performance of the algorithm.

Figure 4:
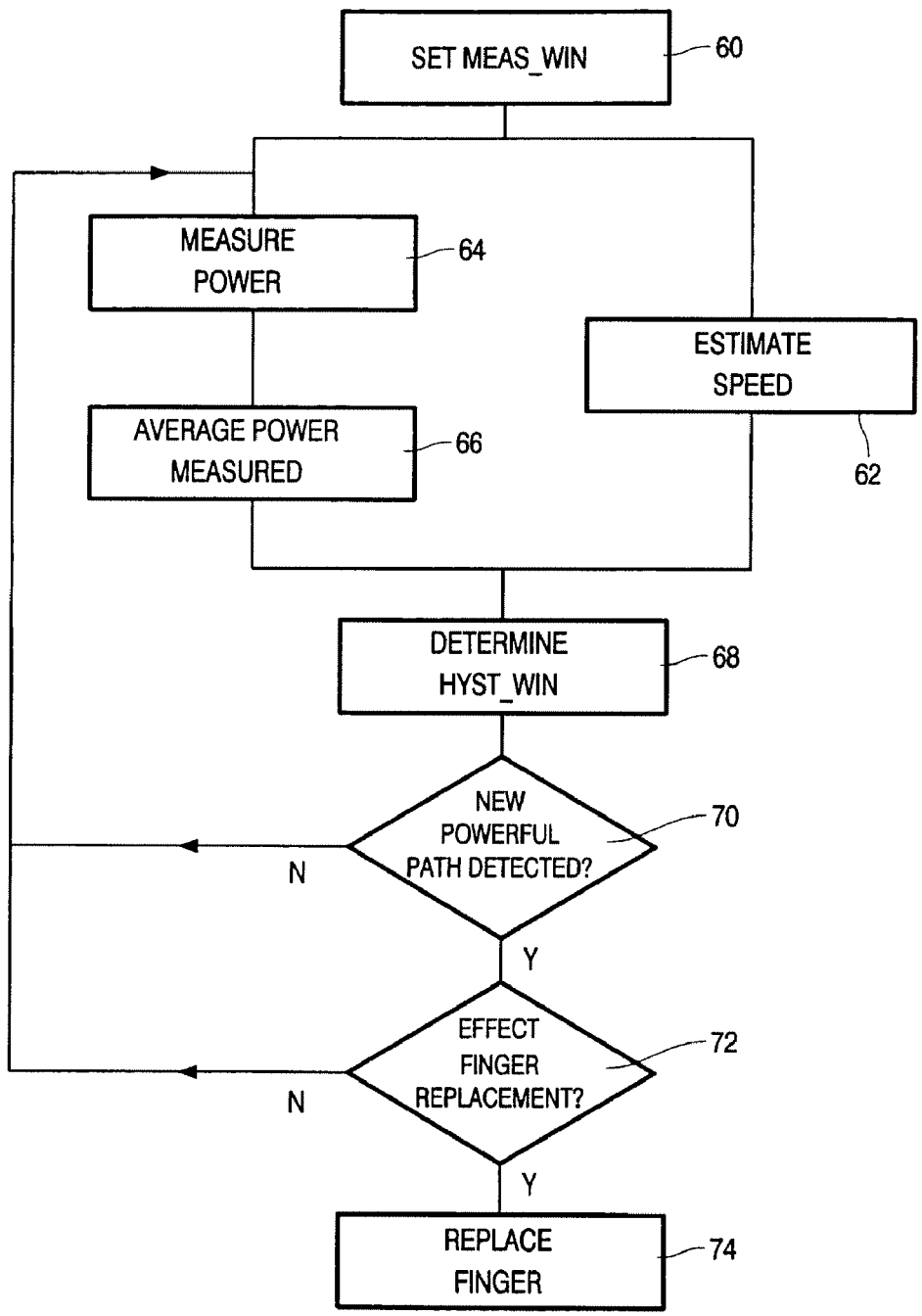
FIG. 4 is a flow chart relating to a first algorithm for implementing the method in accordance with the present invention.

FIG. 4 is an embodiment of a flow chart for implementing the algorithm (1). The flow chart begins with a step 60 which relates to the operation of setting the MEAS_WIN, that is for example selecting one of the curves MW4 to MW12 in FIG. 3. The speed of the receiver is estimated as indicated by the step 62 and, concurrently with the speed estimation, the power in each of the Rake fingers is estimated as indicated by the step 64 and the average of the power measurements is obtained as indicated by the step 66. Step 68 relates to the operation of determining HYST_WIN as a function of MEAS_WIN and the estimated speed. Step 70 relates to checking if a new powerful path has been detected. If the answer is No (N), the flow chart reverts back to the step 64. If, however, the answer is Yes (Y) the flow chart proceeds to a step 72 which relates to deciding if finger replacement should be made. If the answer is No (N), the flow chart reverts to the block 64 but if the answer is Yes (Y) then in step 74 finger replacement is effected.

Figure 5:
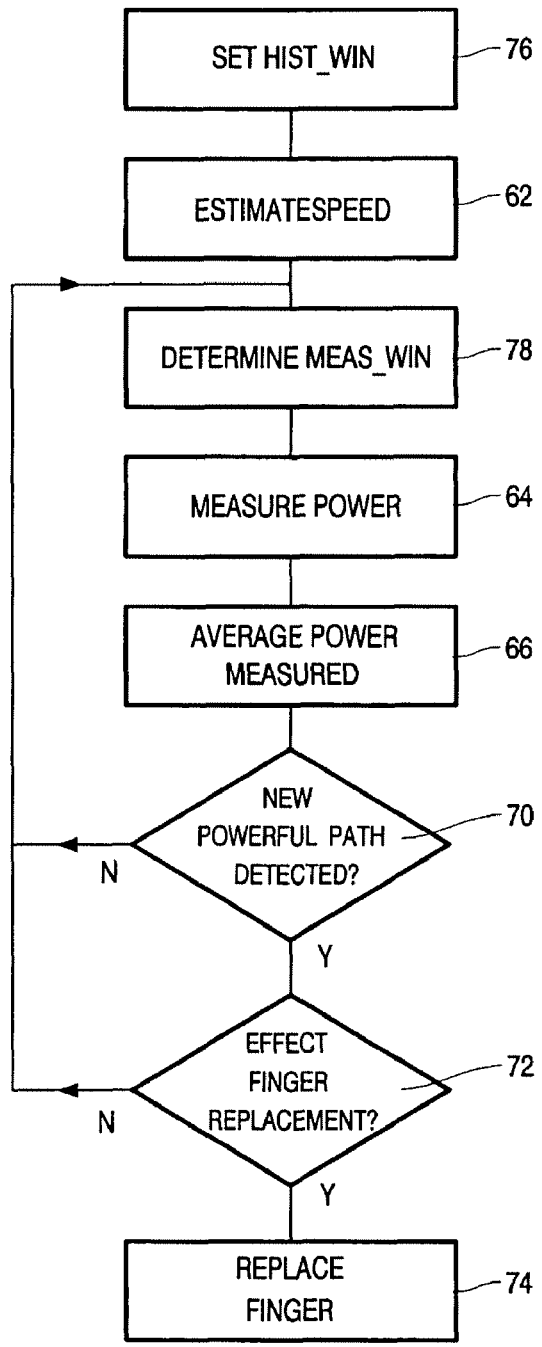
FIG. 5 is a flow chart relating to a second algorithm for implementing the method in accordance with the present invention.

FIG. 5 is an embodiment of a flow chart for implementing the algorithm (2). The flow chart commences with step 76 relating to the setting of HIST_WIN, that is to a value such as 0.6 in FIG. 3. The speed of the receiver is estimated in the step 62 and in a step 78 the MEAS_WIN is determined in response to the estimated speed. Steps 64 and 66 respectively relate to measuring the power in each Rake finger and making an average power measurement. Step 70 relates to checking if a new powerful path has been detected. If the answer is No (N) the flow chart reverts to the step 78. Step 72 relates to making a decision regarding path replacement and if the answer is No (N) the flow chart reverts to the step 78 but if it is Yes (Y) the flow chart proceeds to the step 74 relating to the operation of effecting finger replacement.

The operations illustrated in FIGS. 4 and 5 can be carried-out in a suitably programmed processor. In the case of estimating speed, for example by determining the Doppler frequency $f_D$, this is likely to change slowly compared to the speed of effecting the calculations and as a consequence it could be assumed to be constant over the period of several MEAS_WINs thereby avoiding the need the estimate the speed continuously.

In the present specification and claims the word "a" or "an" preceding an element does not exclude the presence of a plurality of such elements. Further, the word "comprising" does not exclude the presence of other elements or steps than those listed.

The use of any reference signs placed between parentheses in the claims shall not be construed as limiting the scope of the claims.

From reading the present disclosure, other modifications will be apparent to persons skilled in the art. Such modifications may involve other features which are already known in the design, manufacture and use of communication systems and component parts therefor and which may be used instead of or in addition to features already described herein.

The invention claimed is:

1. A method of operating a Code Division Multiple Access (CDMA) receiver comprising a plurality of finger receivers having inputs for receiving signals and outputs coupled to means for combining their output signals constructively and means for assigning the finger receivers to respective received signals, the method comprising estimating the speed of the CDMA receiver from the signals received and varying the time required to make a finger replacement decision in response to the estimated speed so that the time required decreases as the speed of the CDMA receiver increases and vice versa.

2. A method as claimed in claim 1, wherein the method operates in accordance with an algorithm in which a signal power measurement interval is constant and a hysteresis interval is adjusted as a function of speed.

3. A method as claimed in claim 1, wherein the method operates in accordance with an algorithm in which a hysteresis interval is constant and a power measurement interval is adjusted as a function of speed.

4. A method as claimed in claim 1, comprising estimating the speed of the CDMA receiver is based on a measurement of the Doppler frequency and/or bandwidth.

5. A method as claimed in claim 1, comprising monitoring multipath paths to respective finger receivers, monitoring the strength of the received signals, re-assigning, in response to the detection of a powerful signal, one of the paths to the powerful signal.

6. Code Division Multiple Access (CDMA) receiver comprising a plurality of finger receivers having inputs for receiving signals and outputs coupled to means for combining their output signals constructively and means for assigning the finger receivers to respective received signals, wherein the CDMA receiver further comprises means for estimating the speed of the CDMA receiver from the signals received and means responsive to an estimation of the speed of the CDMA receiver for varying the time required to make a finger replacement decision in response to the estimated speed so that the time required decreases as the speed of the CDMA receiver increases and vice versa.

7. A CDMA receiver as claimed in claim 6, wherein the means for varying the time operates in accordance with an algorithm in which a signal power measurement interval is constant and a hysteresis interval is adjusted as a function of speed.

8. A CDMA receiver as claimed in claim 6, wherein the means for varying the time operates in accordance with an algorithm in which a hysteresis interval is constant and a power measurement interval is adjusted as a function of speed.

9. A CDMA receiver as claimed in claim 6, wherein the means for estimating the speed of the CDMA receiver is adapted to estimate the speed from a measurement of the Doppler frequency and/or bandwidth.

10. A CDMA receiver as claimed in claim 6, comprising means for monitoring multipath paths to respective finger receivers, means for monitoring the strength of the received signals, and means for re-assigning, in response to the detection of a powerful signal, one of the paths to the powerful signal.

11. Code Division Multiple Access (CDMA) communications system comprising a primary station and at least one secondary station, the secondary station including a transmitter and a CDMA receiver, the CDMA receiver comprising a plurality of finger receivers having inputs for receiving signals and outputs coupled to means for combining their output signals constructively and means for assigning the finger receivers to respective received signals, wherein the CDMA receiver further comprises means for estimating the speed of the receiver from the signals received and means responsive to an estimation of the speed of the CDMA receiver for varying the time required to make a finger replacement decision in response to the estimated speed so that the time required decreases as the speed of the CDMA receiver increases and vice versa.

12. A CDMA communications system as claimed in claim 11, wherein the means for varying the time operates in accordance with an algorithm in which a signal power measurement interval is constant and a hysteresis interval is adjusted as a function of speed.

13. A CDMA communications system as claimed in claim 11, wherein the means for varying the time operates in accordance with an algorithm in which a hysteresis interval is constant and a power measurement interval is adjusted as a function of speed.

14. A CDMA communications system as claimed in claim 11, wherein the means for estimating the speed of the CDMA receiver is adapted to estimate the speed from a measurement of the Doppler frequency and/or bandwidth.

15. A CDMA communications system as claimed in claim 11 comprising means for monitoring multipath paths to respective finger receivers, means for monitoring the strength of the received signals, and means for re-assigning, in response to the detection of a powerful signal, one of the paths to the powerful signal.

16. A method of operating a Code Division Multiple Access (CDMA) communications system comprising a primary station and at least one secondary station, the primary station comprising a transmitter for transmitting CDMA signals on a downlink, and the at least one secondary station including a CDMA receiver for receiving CDMA signals transmitted on the downlink, the CDMA receiver comprising a plurality of finger receivers having inputs for receiving signals and outputs coupled to means for combining their output signals constructively and means for assigning the finger receivers to respective received signals, the method comprising receiving signals on the downlink, estimating the speed of the CDMA receiver from the signals received and varying the time required to make a finger replacement decision in response to the estimated speed so that the time required decreases as the speed of the CDMA receiver increases and vice versa.

17. A method as claimed in claim 16, wherein the method operates in accordance with an algorithm in which a signal power measurement interval is constant and a hysteresis interval is adjusted as a function of speed.

18. A method as claimed in claim 16, wherein the method operates in accordance with an algorithm in which a hysteresis interval is constant and a power measurement interval is adjusted as a function of speed.

19. A method as claimed in claim 16, comprising estimating the speed of the CDMA receiver from a measurement of the Doppler frequency and/or bandwidth.

20. A method as claimed in claim 16 comprising monitoring multipath paths to respective finger receivers, monitoring the strength of the received signals, re-assigning, in response to the detection of a powerful signal, one of the paths to the powerful signal.

* * * * *